(12) United States Patent
Yokochi

(10) Patent No.: US 9,383,532 B2
(45) Date of Patent: Jul. 5, 2016

(54) OPTICAL MODULE

(71) Applicant: SUMITOMO ELECTRIC INDUSTRIES, LTD., Osaka-shi, Osaka (JP)

(72) Inventor: Toshihisa Yokochi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/320,812

(22) Filed: Jul. 1, 2014

(65) Prior Publication Data

US 2015/0010282 A1    Jan. 8, 2015

(30) Foreign Application Priority Data

Jul. 4, 2013   (JP) .................................. 2013-140473

(51) Int. Cl.
*G02B 6/44* (2006.01)

(52) U.S. Cl.
CPC ............ *G02B 6/4416* (2013.01); *G02B 6/4435* (2013.01); *G02B 6/4477* (2013.01); *G02B 6/4403* (2013.01)

(58) Field of Classification Search
None
See application file for complete search history.

(56) References Cited

U.S. PATENT DOCUMENTS

| 4,884,862 | A  | * | 12/1989 | Kofod    | G02B 6/3878  |
|-----------|----|---|---------|----------|--------------|
|           |    |   |         |          | 174/76       |
| 6,389,214 | B1 | * | 5/2002  | Smith    | G02B 6/4472  |
|           |    |   |         |          | 385/136      |
| 7,270,485 | B1 | * | 9/2007  | Robinson | G02B 6/4477  |
|           |    |   |         |          | 385/136      |
| 8,039,745 | B2 | * | 10/2011 | Sedor    | G02B 6/4477  |
|           |    |   |         |          | 174/74 R     |
| 8,801,300 | B2 | * | 8/2014  | Arao     | G02B 6/4477  |
|           |    |   |         |          | 385/139      |
| 8,816,222 | B2 | * | 8/2014  | Pimentel | G02B 6/4477  |
|           |    |   |         |          | 174/650      |
| 2003/0044126 | A1 | * | 3/2003 | Kawano  | G02B 6/2551  |
|           |    |   |         |          | 385/88       |
| 2014/0241674 | A1 | * | 8/2014 | Isenhour | G02B 6/4284  |
|           |    |   |         |          | 385/93       |

FOREIGN PATENT DOCUMENTS

JP          3988655 B2    10/2007

* cited by examiner

*Primary Examiner* — Sung Pak
(74) *Attorney, Agent, or Firm* — Drinker Biddle & Reath LLP

(57) ABSTRACT

The optical module 10 includes an optical cable 11 including a first tension member 16 surrounding the optical fiber 14, a second tension member 17 surrounding the first tension member, and an outer sheath 20 surrounding the second tension member; and a housing 20 attached at a terminal of the optical cable 11, wherein the first tension member 16 and the second tension member 17 are fixed to the housing 20 to endure a tensile force applied to the optical cable.

7 Claims, 11 Drawing Sheets

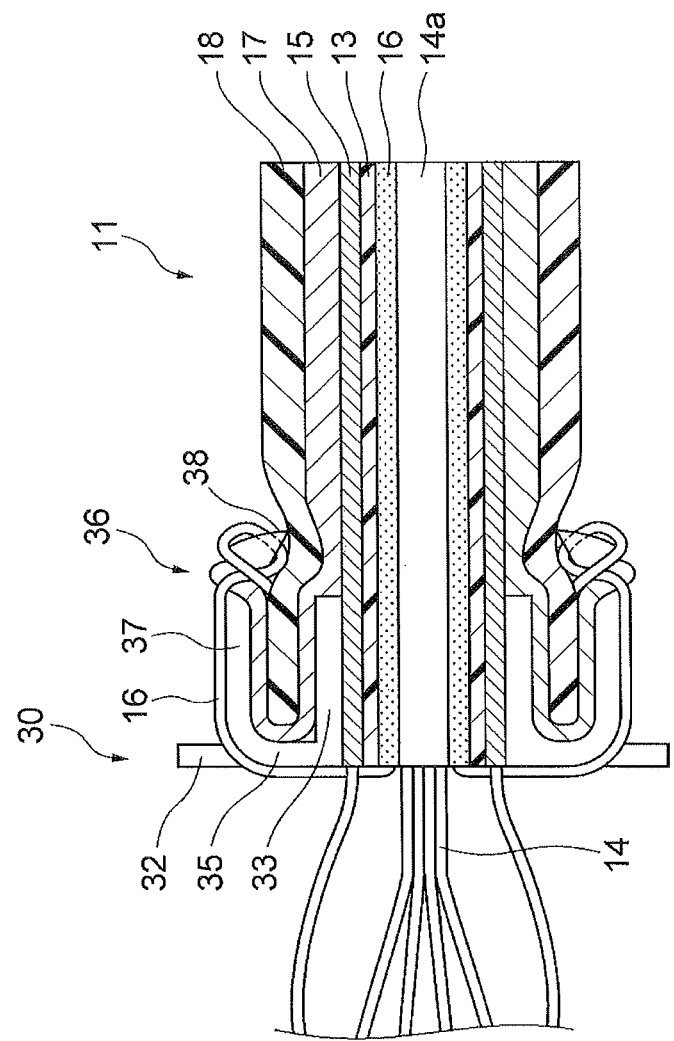

OPTICAL MODULE

FIELD OF INVENTION

The present invention relates to an optical module.

BACKGROUND OF THE INVENTION

An optical module including a circuit board, a photoelectric conversion portion which is mounted on the circuit board and is connected to an optical fiber of an optical cable, and a metal housing for receiving the circuit board has been known. The optical module converts an electrical signal to an optical signal by the photoelectric conversion portion, and transmits a signal by the optical signal.

The optical cable used in this optical module has been known to be a metallic pipe type optical cable in which an outer periphery of an optical fiber having a single core or multiple cores is covered with a metallic pipe, a tensile member for increasing a tensile strength is added on an outer periphery of the metallic pipe, and the outer periphery of the metallic pipe is covered with an outer sheath (for example, reference Japanese Patent No. 3988655).

The metallic pipe and the tensile member of the optical module are exposed to the outside by removing the outer sheath of an end of the optical cable. Two cylindrical metallic sleeves are inserted onto an outer periphery of the exposed metallic pipe and the exposed tension member. Further, a first metallic sleeve at an end side of the optical cable is crimped, and the tension member is then fold. Thereafter, a distal end of the fold tension member is inserted into the second metallic sleeve, which is previously inserted, to crimp the second metallic sleeve, so that the tension member is fixed on an outer periphery of the metallic pipe.

SUMMARY OF THE INVENTION

However, in the optical module, since a transmission wire such as an optical fiber is protected by tension member arranged in one place, a signal wire may be insufficiently protected to a strong tensile force applied to the optical cable. In particular, when an electrical-optical composite cable, in which an optical fiber is arranged together with an electric wire, is used as a transmission wire, the signal wire may be insufficiently protected to the tensile force applied to each transmission wire.

An aspect of the present invention is to provide an optical module which can protect a transmission wire such as an optical fiber from a tensile force applied to an optical cable.

An aspect of the present invention is to provide an optical module comprising: an optical cable including an optical fiber; a first tension member surrounding the optical fiber; a second tension member surrounding the first tension member; an outer sheath surrounding the second tension member; and a housing attached on a terminal of the optical cable, wherein the first tension member and the second tension member are fixed to the housing to endure a tensile force applied to the optical cable.

Another aspect of the present invention will be made clear through the following specification and disclosure of the drawings.

BRIEF DESCRIPTION OF THE DRAWINGS

FIG. 11 is a sectional view illustrating an installation state of the optical cable terminal brace of FIG. 6.

DETAILED DESCRIPTION OF THE INVENTION

Figure 1:
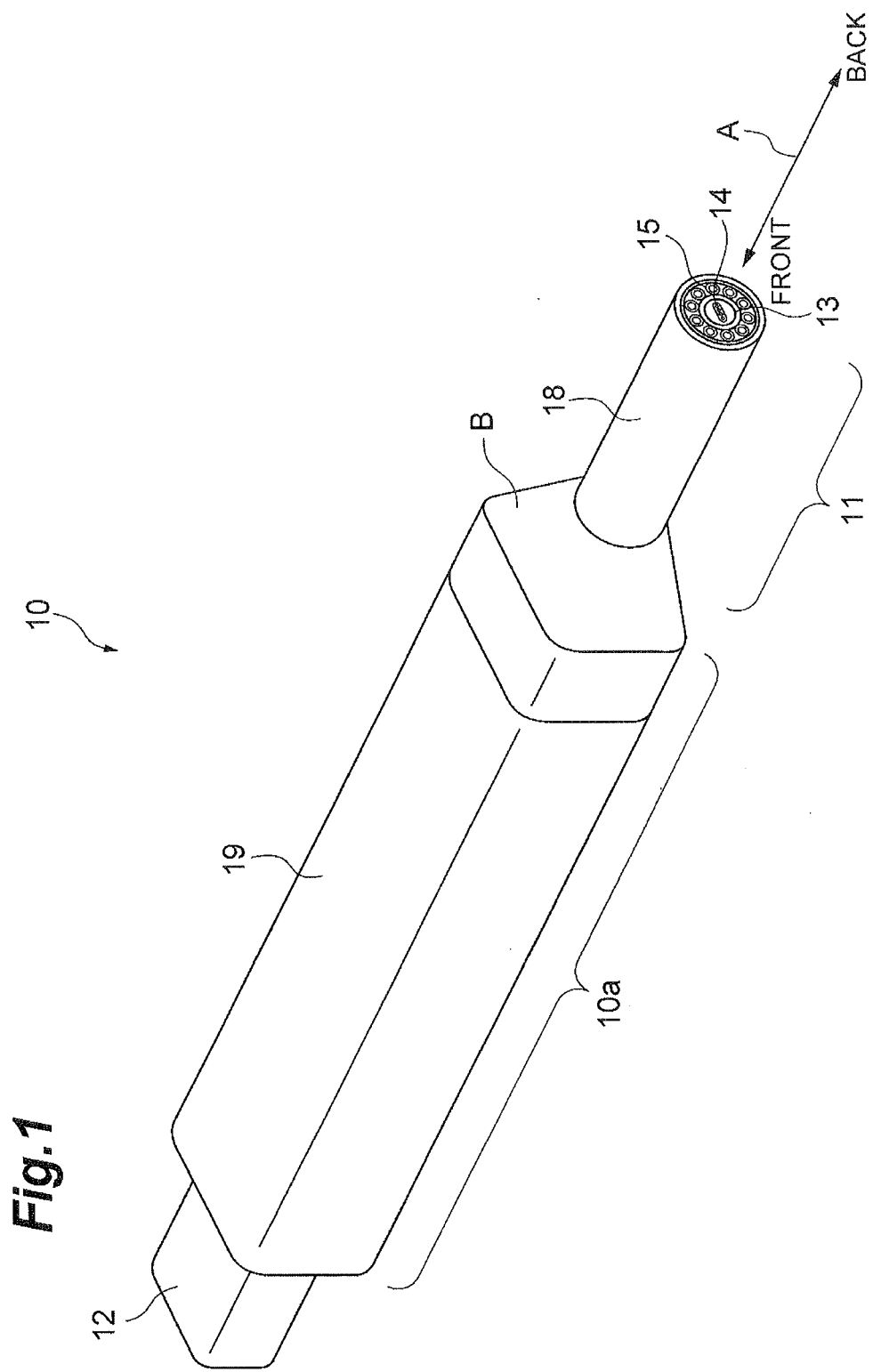
FIG. 1 is a perspective view illustrating an example of an optical module according to the present invention.

At least the following items will become clear based on the specification and the drawings described below.

(1): an optical module includes an optical cable having an optical fiber, a first tension member surrounding the optical fiber, a second tension member surrounding the first tension member, and an outer sheath surrounding the second tension member; and a housing attached on a terminal of the optical cable, wherein the first tension member and the second tension member are fixed to the housing to endure a tensile force to the optical cable.

According to such a configuration, even when a tensile force to a side opposite to a direction in which the housing is fixed is applied to the optical cable, the optical module can endure the tensile force by diffusing the tensile force into the two places which are the first tension member and the second tension member. As a result, the optical fiber can be protected from the tensile force.

(2): the optical module described in (1), which further includes an optical cable terminal brace configured to fix the optical cable to the housing; wherein the first tension member and the second tension member are fixed to the optical cable terminal brace, and the optical cable terminal brace is fixed to the housing.

According to such a configuration, the first tension member and the second tension member can be easily fixed to the housing.

(3): the optical module described in (2), wherein the optical cable terminal brace comprises a main body portion, and the main body portion comprises an outer sheath fixing portion configured to fix the outer sheath, and an insertion passage configured to insert the optical fiber into the outer sheath fixing portion.

According to such a configuration, the optical fiber can be protected from the tensile force by fixing the outer sheath to the optical cable terminal brace.

(4): the optical module described in (3), wherein the optical cable terminal brace comprises a side portion at a lateral side of the main body portion, and the first tension member and the second tension member are fixed to the side portion.

According to such a configuration, the first tension member and the second tension member can be easily fixed to the optical cable terminal brace.

(5): the optical module described in (4), wherein the first tension member passes through the insertion passage, and is disposed along one surface of the side portion, and the second tension member does not pass through the insertion passage, and is disposed along the other surface of the side portion.

According to such a configuration, the first tension member, the second tension member and the outer sheath can be easily fixed to the optical cable terminal brace.

(6): the optical module described in (4), wherein the first tension member is fixed to the optical cable terminal brace by being wound at the side portion.

According to such a configuration, the first tension member can be rigidly fixed to the optical cable terminal brace.

(7): the optical module described in (6), wherein the second tension member is disposed along the side portion, and the first tension member fixes the second tension member to the optical cable terminal brace by inserting the second tension member between the side portion and the first tension member.

According to such a configuration, the first tension member and the second tension member can be easily fixed to the optical cable terminal brace.

(8): the optical module described in (7), wherein the second tension member is fixed to the optical cable terminal brace by being wound at the side portion.

According to such a configuration, the second tension member can be rigidly fixed to the optical cable terminal brace.

(9): the optical module described in (6), wherein the side portion further includes a plurality of winding portions, the plurality of winding portions are installed symmetrically with respect to a central axis of a cable insertion passage, and at least one of the first tension member and the second tension member is wound at the winding portion.

According to such a configuration, a tensile force is dispersedly transferred to the optical cable terminal brace, so that the optical cable terminal brace can be prevented from being damaged by the tensile force.

(10): the optical module described in (4), wherein the side portion is folded forward the main body portion, and the outer sheath is fixed to the main body portion while being in contact with the side portion and an outer periphery of the main body portion.

According to such a configuration, the first tension member, the second tension member and the outer sheath can be easily fixed to the optical cable terminal brace.

(11): the optical module described in (1), wherein the optical cable further includes a transmission wire different from the optical fiber, between the first tension member and the second tension member.

According to such a configuration, the tensile force to the outer sheath can be prevented from being applied to the transmission wire (the optical fiber or the electric wire), so that the transmission wire can be sufficiently protected from the tensile force.

(12): the optical module described in (1), wherein the housing receives a circuit board, and a photoelectric conversion portion which is mounted on the circuit board and is connected to the optical fiber.

According to such a configuration, the tensile force is prevented from being applied to the photoelectric conversion portion to which the optical fiber is connected.

(13): the optical module described in (12), wherein the optical cable further includes a transmission wire different from the optical fiber, between the first tension member and the second tension member, the transmission wire is an electric wire, and the electric wire is soldered onto the circuit board.

According to such a configuration, the tensile force is prevented from being applied to the circuit board on which the transmission wire is connected.

A more detailed example of an embodiment according to the present invention will be described below with respect to the accompanying drawings. In the description of the drawings, the same element will be designated by the same reference numeral and a duplicate description thereof will be omitted. Further, in each drawing used for the following description, a scale is properly changed in order to illustrate each member with an identifiable size.

As illustrated in FIG. 1, an optical module 10 according to the present embodiment has a configuration in which an end of an optical cable 11 is connected to a connector 10a. The optical cable 11 introduces a transmission wire such as an optical fiber 14 or an electric wire 15 into the connector 10a. The connector 10a includes an electric connector 12 installed at a distal end thereof, and an external housing 19 enclosing a metal housing 20 (See FIG. 2) which receives a circuit board 22. A portion connecting the optical cable 11 and the housing 20 is covered with a boot B.

Figure 2:
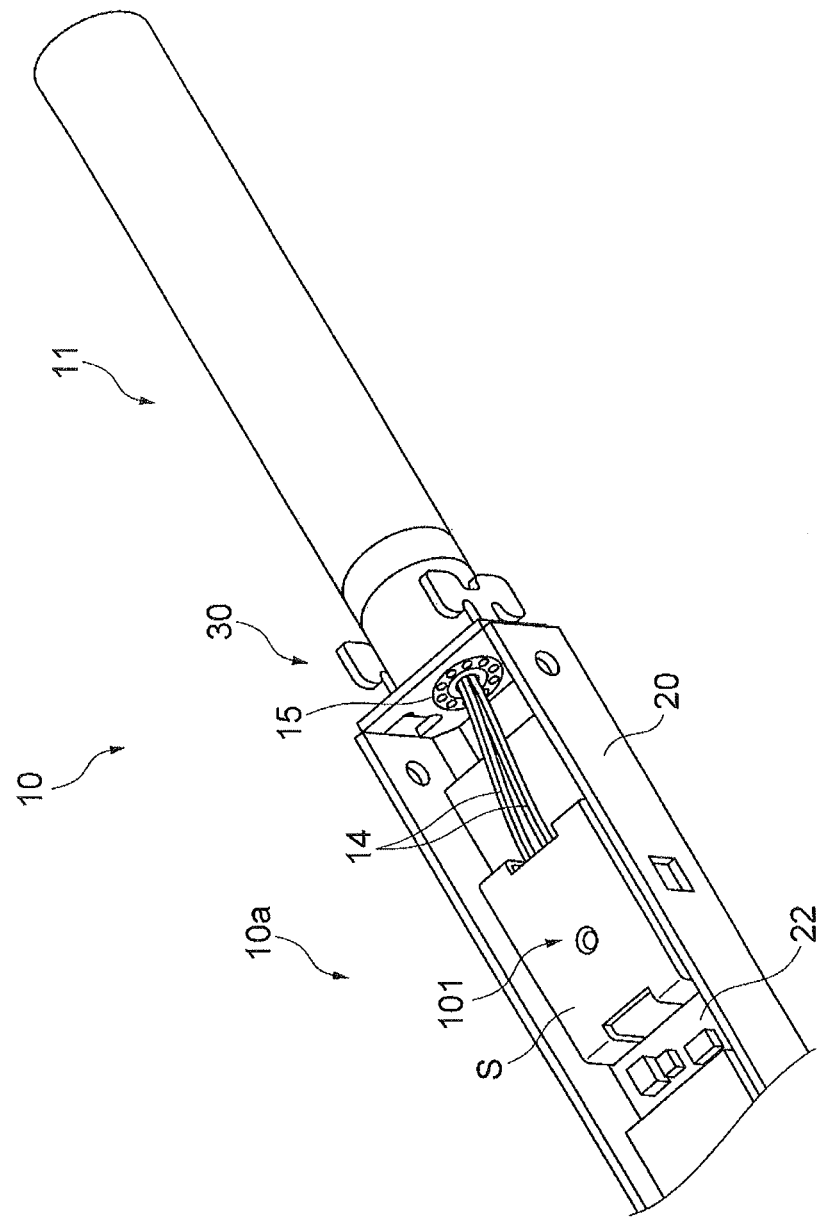
FIG. 2 is a perspective view illustrating an internal portion of the optical module of FIG. 1.

As illustrated in FIG. 2, in the optical module 10 according to the present embodiment, the housing 20 is attached at a terminal of the optical cable 11. A distal end of the optical cable 11 is fixed to an optical cable terminal brace 30, and the optical cable terminal brace 30 is fixed to the housing 20. That is, the housing 20 is fixed to the optical table 11 by the optical cable terminal brace 30. Further, the housing 20 receives the circuit board 22 and the photoelectric conversion portion which is mounted on the circuit board 22 and is connected to the optical fiber 14. Further, the electric wire 15 is soldered at an electric portion (not illustrated) of the circuit board 22. In a preferred embodiment, the photoelectric conversion portion is mounted on one surface of the circuit board 22, and the optical fiber 14 is connected to the corresponding one surface. Further, the electric wire 15 is connected to the other surface of the circuit board 22.

Figure 3:
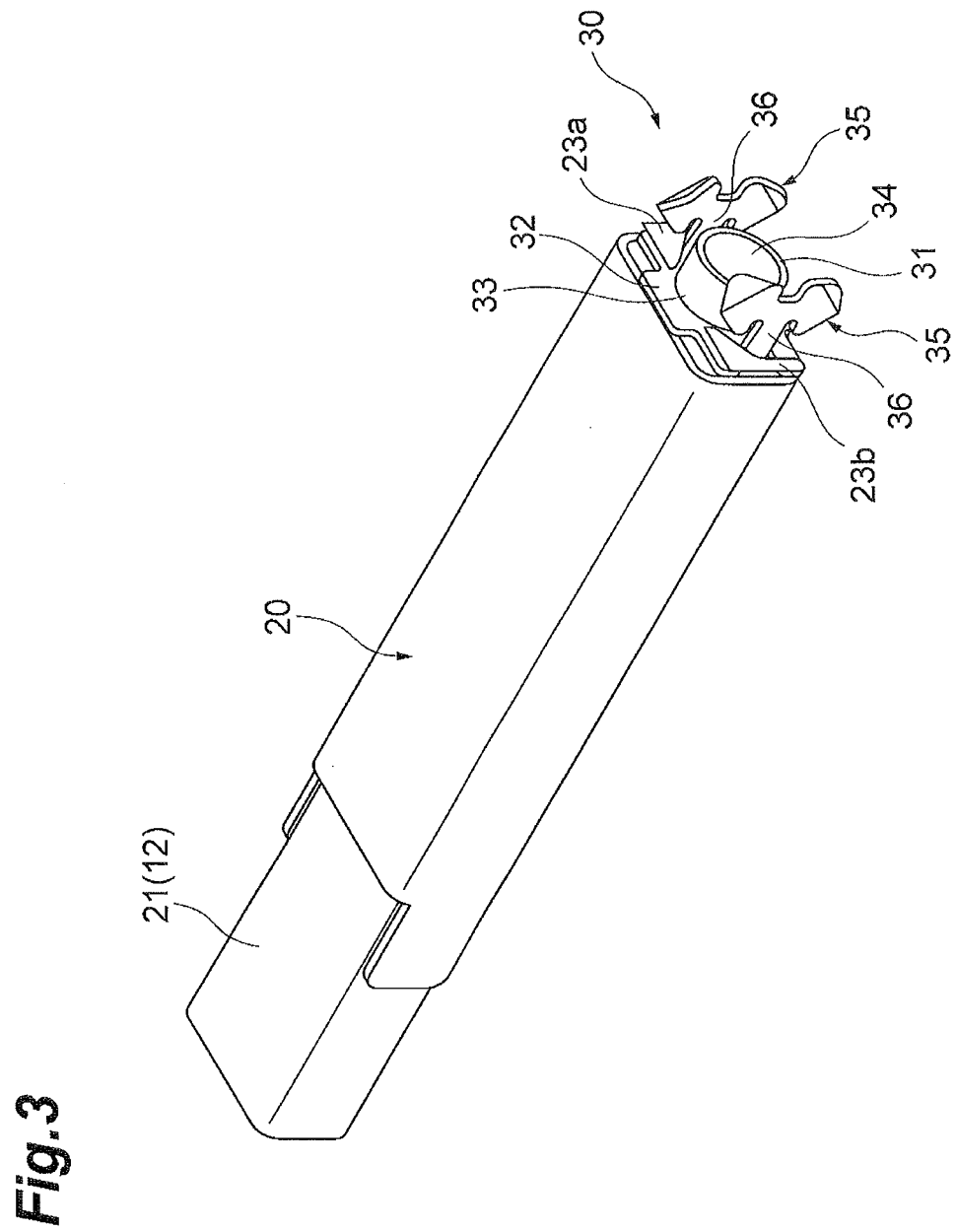
FIG. 3 is a perspective view illustrating a housing and an optical cable terminal brace of the optical module of FIG. 1.

As illustrated in FIGS. 2 and 3, the housing 20 has an approximately rectangular cylindrical shape, and defines a space S for receiving the circuit board 22 etc. Further, an electric connector 12 (See FIG. 3) is installed at a front end of the housing 20, and the optical cable terminal brace 30 for fixing the optical cable 11 is connected to a rear end of the housing 20. The housing 20 is made of a metallic material which have a high thermal conductivity (preferably, equal to or higher than 100 W/m·K) such as steel (Fe-based), a tin plate (tin-plated copper), stainless steel, copper, brass, aluminum, etc.

A connector fixing portion 21 for maintaining the electric connector 12 is installed at a front end of the housing 20. The connector fixing portion 21 receives the electric connector 12, and prevents the electric connector 12 (the circuit board 22) from moving in the front-rear direction of. A front end of the connector fixing portion 21 is approximately flush with a front end of the electric connector 12. Further, holding pieces 23a and 23b are installed at the housing 20. The pair of holding pieces 23a and 23b are installed at opposite sides (left and right) of the rear end of the housing 20, and extend toward a lower portion of the housing 20 while being fold downwardly from an upper portion of the housing 20. The optical cable terminal brace 30 is fixed to the housing 20 by being inserted into the holding pieces 23a and 23b. A configuration in which a distal end of the optical cable 11 is fixed to the optical cable terminal brace 30 will be described below.

Figure 4:
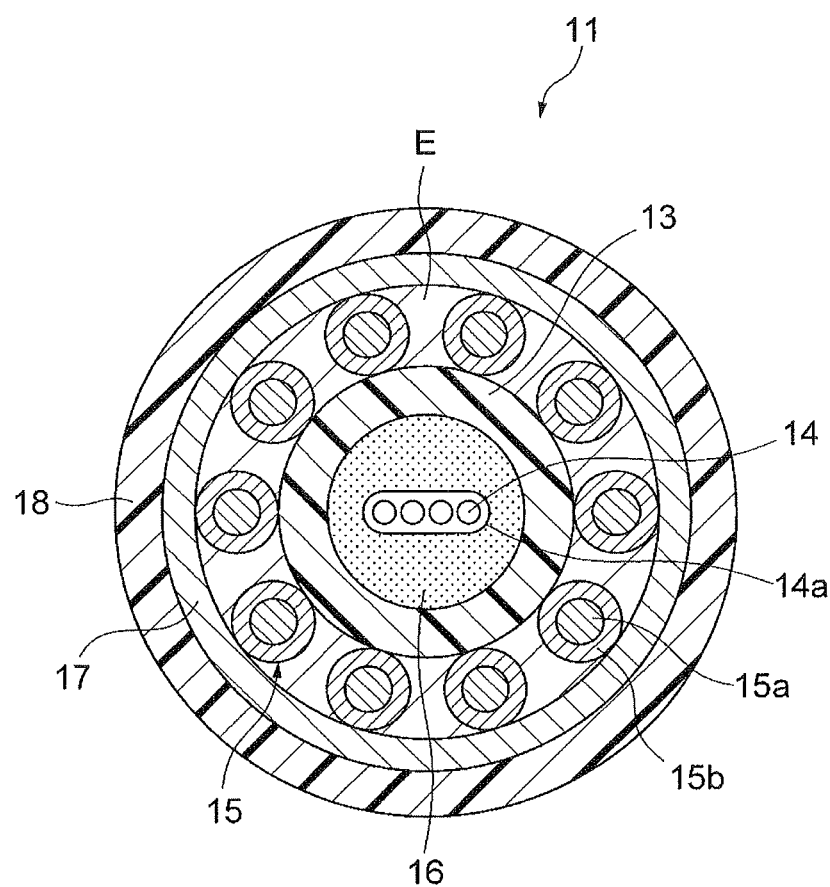
FIG. 4 is a sectional view illustrating a configuration of an optical cable.

As illustrated in FIG. 4, the optical cable 11 includes a first tension member 16 surrounding the optical fiber 14 extending in a predetermined direction of an axial line A (See FIG. 1), a second tension member 17 surrounding the first tensile member 16, and an outer sheath 18 surrounding the second tension member 17. In more detail, the optical cable 11 includes an ribbon optical fiber 14a, a first tension member 16 formed of a bundle of tensile fiber, a cylindrical inner tube 13 for receiving the ribbon optical fiber 14a and the first tension member 16, a second tension member 17 installed around the inner tube 13, and an outer sheath 18 installed at an outer periphery of the second tension member 17. A receiving portion E is a portion between inner sides of the outer sheath 18 or the second tension member 17, and an outer side of the inner tube 13, and a plurality (for example, the number is 10) of electric wires 15 is received in the receiving portion E.

In the ribbon optical fiber 14a, a plurality (in the present example, the number is 4) of optical fibers 14 are integrated one-dimensionally in parallel by a coating resin to have a tape-like shape. The optical fiber 14 may be an All Glass Fiber (AGF) of which both of the core and the cladding are made of glass, or a Hard Plastic Clad Fiber (HPCF) of which the cladding is made of a rigid plastic while the core is made of glass, etc. Further, a plurality of ribbon optical fiber 14a may be installed.

The inner tube 13 is made of an insulating resin, for example, a Poly Vinyl Chloride (PVC), etc. which is a Non-halogen flame retarded resin. The inner tube 13 has, for example, an outer diameter of 2.0 mm and a thickness of 0.55 mm.

The first tension member 16 is, for example, an aramid fiber having a very small diameter, and is bundled and embedded in the optical cable 11. The first tension member 16 enables the optical cable 11 to endure a tensile force.

The second tension member 17 is, for example, a braided tin-plated conductive wires, and enables the optical cable 11 to endure a tensile force. Preferably, the second tension member 17 is configured to have a Young' Modulus higher than that of the outer sheath 18. Further, it is preferred that the second tension member 17 disposed to be further out than the first tension member 16 is configured by a tin-plated conductive wire which is a rectangular wire as an example so as to improve a thermal conduction. Further, a braided density of the second tension member 17 is, for example, preferably equal to or higher than 70%, a braided angle is preferably from 45 to 60°, and a thermal conductivity is, for example, preferably 400 W/m·K. Further, the second tension member 17 may be obtained by horizontally winding a copper wire or a copper alloy wire, or by winding a metal resin tape in which a copper foil or an aluminum foil is formed on a resin tape made of a Poly Ethylene-Terephthalate (PET) resin.

The outer sheath 18 is made of an insulating resin such as a polyolefin, etc. The outer sheath 18 has, for example, an outer diameter of 4.2 mm and a thickness of 0.5 mm.

The electric wires 15 may employ an insulating cable obtained by covering, with a coating 15b, a conductor 15a obtained by twisting a plurality of tin-plated annealed copper wires or a plurality of copper alloy wires, and for example, a cable of about AWG 20 to 46 according to the American Wire Gauge (AWG) may be used. A material of the coating 15b may be a fluoro resin such as a tetrafluoroethylene-perfluoroalkylvinyl ether copolymer (PFA) resin having a heat resisting property, a high chemical resistance property, a high non-adhesive property, a high self-lubrication property, etc.

Figure 5:
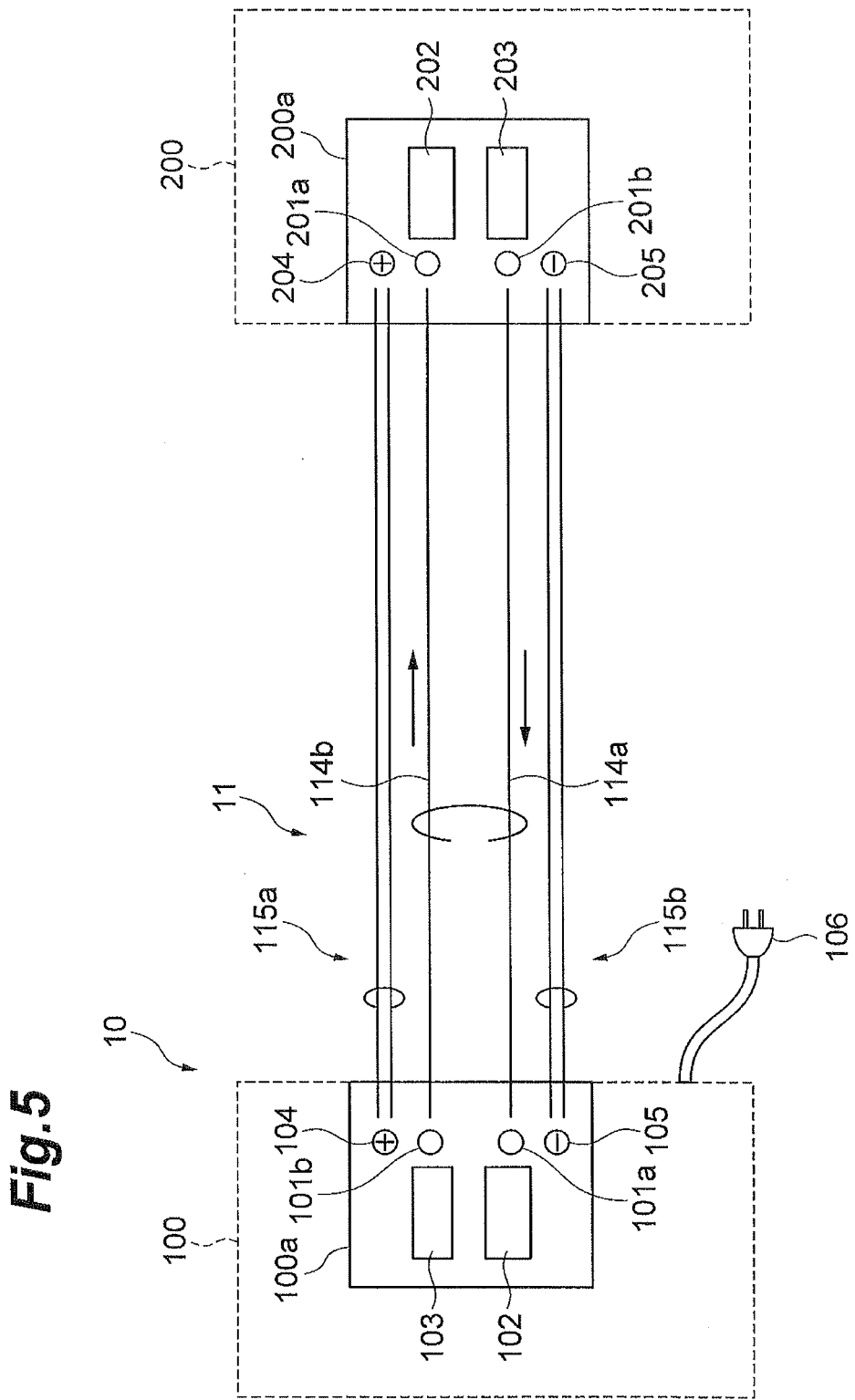
FIG. 5 is a concept view illustrating an example where the optical module of FIG. 1 is used.

As an example of using the optical module 10, FIG. 5 is a concept view for describing a state where a personal computer 100 and an electric power supply type hard disk 200 are electrically and optically connected to each other by the optical module 10. As illustrated in FIG. 5, the optical module 10 connects a Personal Computer (PC) side connector 100a (an example of the connector 10a) connected to a cable connection portion of the personal computer 100 and a hard disk side connector 200a (an example of the connector 10a) connected to a cable connection portion of the electric power supply type hard disk 200.

The PC side connector 100a includes a light receiving element 102, a light emitting element 103, a plus electrode 104 and a minus electrode 105. The light receiving element 102 receives, through a lens 101a, an optical signal transmitted from the electric power supply type hard disk 200 via an optical fiber 114a. The light emitting element 103 transmits an optical signal at the personal computer 100 side to the optical fiber 114b through the lens 101b. A light receiving element 102 and a light emitting element 103a is an example of a photoelectric conversion portion. The plus electrode 104 is connected to five electric wires 115a (for example, soldering). The minus electrode 105 is connected to five electric wires 115b (for example, soldering). Further, the personal computer 100 has an electric power socket 106.

The hard disk side connector 200a includes a light receiving element 202, a light emitting element 203, a plus electrode 204 and a minus electrode 205. The light receiving element 202 receives, through a lens 201a, an optical signal transmitted via the optical fiber 114b. The light emitting element 203 transmits an optical signal to the optical fiber 114a through a lens 201b. The plus electrode 204 is connected to an electric wire 115a (for example, soldering). The minus electrode 205 is connected to an electric wire 115b (for example, soldering).

The electric power supply type hard disk 200 operates by supplying electric power from the personal computer 100 through the electric wires 115a and 115b received within the optical cable 11. That is, the electric wires 115a and 115b are power supply wires. Further, the electric power supply type hard disk 200 exchanges data with the personal computer 100 by performing high speed communication through the optical fibers 114a and 114b. Further, the electric wires 115a and 115b are used as electric power wires, and are also used as communication wires when low speed transmission/receiving of a signal is required separately with the optical fibers 114a and 114b. In the following description, the optical fibers 114 and the electronic wires 115 refer to transmission wires for performing communication or supply of electric power.

Figure 6:
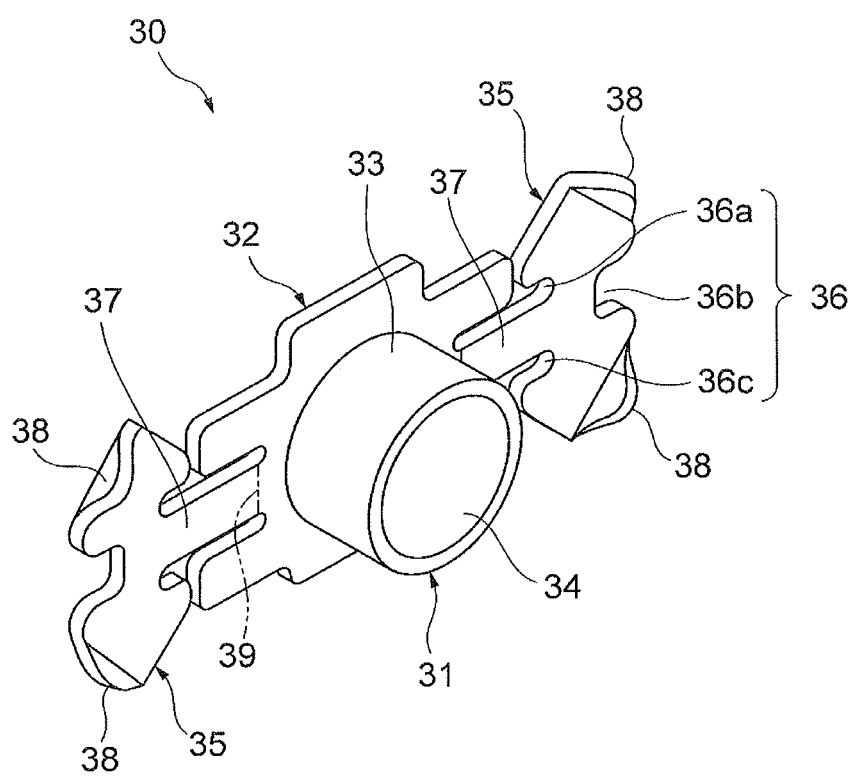
FIG. 6 is a perspective view illustrating an optical cable terminal brace.

As illustrated in FIG. 6, in the optical cable terminal brace 30 according to the present embodiment, a main body portion 31, a base portion 32, and a side portion 35 are integrally formed. The main body portion 31 has a cylindrical shape in which an outer sheath fixing portion 33 for fixing the outer sheath 18, and a cable insertion passage 34 in the outer sheath fixing portion 33 for passing through the optical fiber 14 are formed. The base portion 32 is formed at a front end of the main body portion 31 and has a flat-plate shape. That is, the main body portion 31 is installed to protrude backwardly from the base portion 32. Referring to FIG. 3, the base portion 32 maintains at the holding pieces 23a and 23b of the housing 20, so that the optical cable terminal brace 30 is fixed to the housing 20.

The side portion 35 has a winding portions 36 formed at opposite sides of the main body portion 31 and the base portion 32. The winding portions 36 are installed in a left-right symmetric shape, and a plurality of first tension members 16 of the optical cable 11 are bunched and wound around the winding portions 36.

Next, a configuration in which a distal end of the optical cable 11 is fixed to the optical cable terminal brace 30 will be described with respect to FIGS. 6 to 8.

Figure 7:
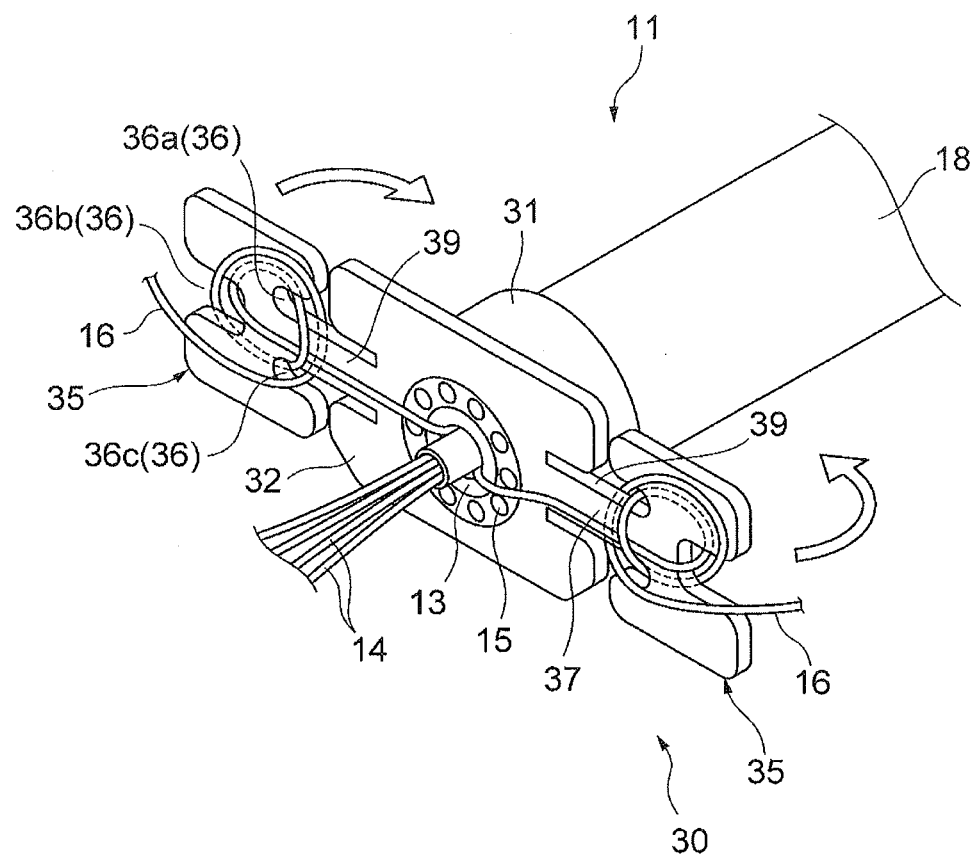
FIG. 7 is a perspective view illustrating an installation state of the optical cable terminal brace of FIG. 6.

As illustrated in FIG. 7, by removing the outer sheath 18 of the optical cable 11 is, the second tension member 17 (See FIG. 4) is exposed. Next, the optical fiber 14, the inner tube 13, the electric wire 15 and the first tension member 16, of the optical cable 11 are inserted into the cable insertion passage 34. Further, the first tension member 16 inserted through the cable insertion passage 34 (See FIG. 6) is extracted along a surface of the base portion 32 toward the winding portion 36. Meanwhile, the second tension member 17 is extracted along a rear side of the base portion 32 toward the winding portion 36.

Next, the first tension member 16 is passed from a front side of the winding portion 36 into a first winding concave portion 36b, and then is passed from a rear side of the winding portion 36 into a second winding concave portion 36a, and then is passed from the front side of the winding portion 36 into a third winding concave portion 36c at a lower side. Further, the first tension member 16 is passed from the rear side of the winding portion 36 into the first winding concave portion 36b again, and then is passed from the front side of the winding portion 36 into the second winding concave portion 36a again, and then is passed from the rear side of the winding portion 36 into the third winding concave portion 36c again. In this way, the first tension member 16 is firmly wound without loosening while being wound at the winding concave portions 36a, 36b and 36c of the winding portion 36, several times.

Further, although it is exemplified that the first tension member 16 branches off two parts toward the winding portion 36 at opposite sides thereof, the present invention is not limited thereto. For example, the first tension member 16 may be tied into one part and configured to be wound sequentially at a plurality of end portions 38 located to be symmetric with respect to a central axis of the cable insertion passage 34.

Figure 8:
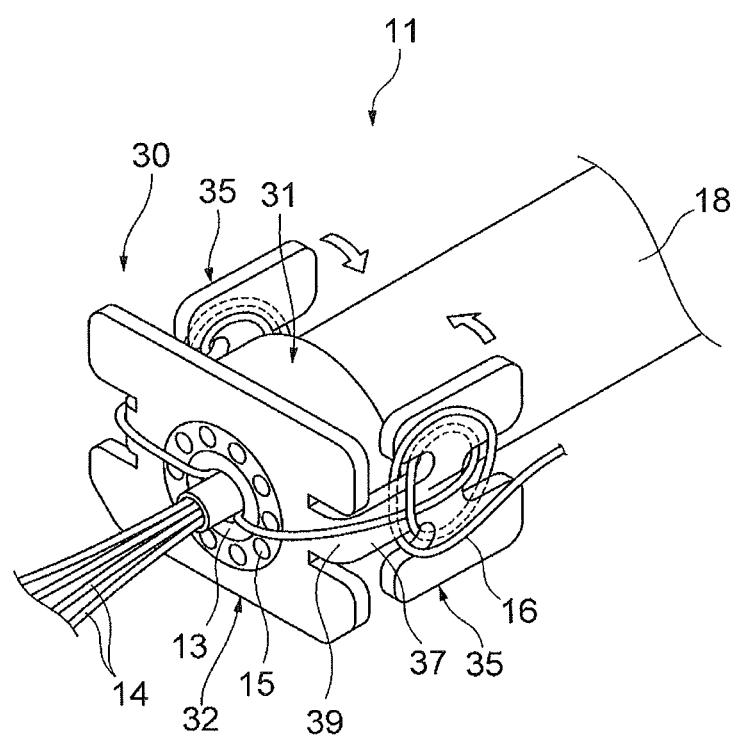
FIG. 8 is a perspective view illustrating an installation state of the optical cable terminal brace of FIG. 6.

As illustrated in FIGS. 7 and 8, the side portion 35 may be fold through a folding portion 39 toward the main body portion 31, and fixes the outer sheath 18. The side portion 35 includes an outer sheath crimping portion 37 formed to be close to the base portion 32, and an end portion 38 (See FIG. 6) formed to be far away from the base portion 32.

The outer sheath crimping portion 37 is connected to the base portion 32 via the folding portion 39, and fixes a part of the outer sheath 18 between an outer sheath fixing portion 33 and the outer sheath crimping portion 37. The winding portion 36 is formed at a location opposite to a portion where the outer sheath crimping portion 37 is connected to the base portion 32. Further, the end portion 38 is formed at the winding portion 36.

As illustrated in FIG. 6, the end portion 38 has an approximately triangular flat-plated shape, and a protrusion is formed at a distal end of the end portion 38 to protrude toward a folding direction of the side portion 35. In this form, a pair of end portions 38 are formed at an upper portion and a lower portion of the winding portion 36 of the side portion 35 at a left side and a right side, respectively. Thus, the total number of the end portions 38 is 4, and the outer sheath 18 is pressed by the plurality of end portions 38. The end portion 38 presses and fixes the outer sheath 18 to a central side of the optical cable 11 such that a step portion 40 (See FIG. 9) is formed between a part of the outer sheath 18 fixed by the outer sheath crimping portion 37 and the other part of the outer sheath 18.

Figure 9:
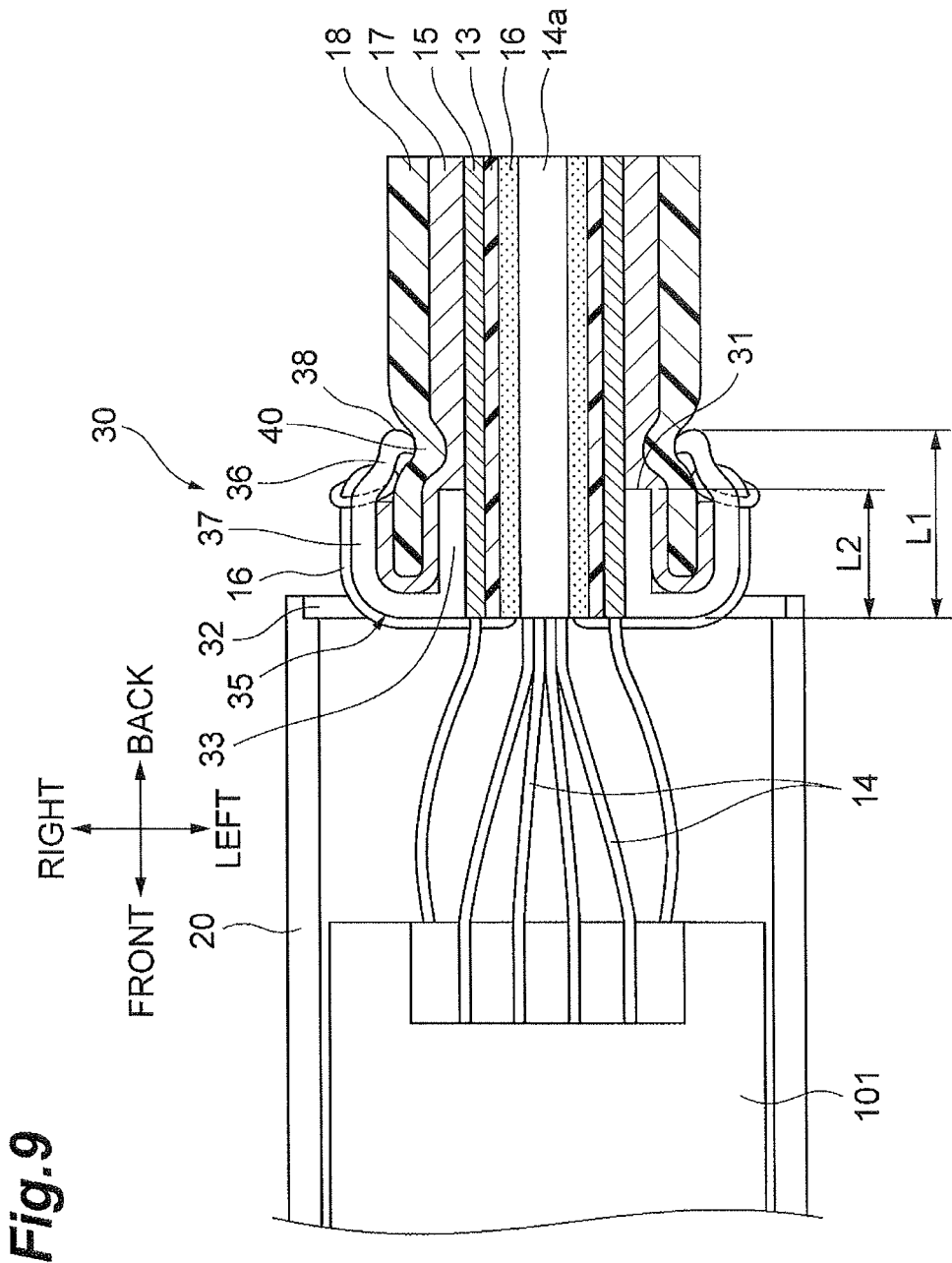
FIG. 9 is a sectional view illustrating an installation state of the optical cable terminal brace of FIG. 6.

Further, as illustrated in FIG. 9, the optical cable terminal brace 30 is formed such that a length L1 of the side portion 35 (corresponding to a length from the base portion 32 to the distal end of the end portion 38) and a length L2 of the main body portion 31 (a length from the base portion 32 to the protrusion) are different from each other when the side portion 35 is fold toward the main body portion 31. If the length L2 of the main body portion 31 is shorter than the length L1 of the side portion 35, the end portion 38 can be fixed to be closer to a central side of the optical cable 11 than the outer sheath crimping portion 37 because when the optical cable terminal brace 30 is crimped, the outer sheath crimping portion 37 is fixed to the main body portion 31 (the outer sheath fixing portion 33), while the main body portion 31 is not formed at a location opposite to the end portion 38, for that reason FIG. 9 illustrates the optical cable terminal brace 30 connected to the housing 20 of the optical module 10, and illustrates a sectional view when the optical cable 11 is fixed to the optical cable terminal brace 30.

As illustrated in FIG. 9, in the side portion 35 crimps outer sheath 18 between the outer sheath crimping portion 37 and the outer sheath fixing portion 33 of the main body portion 31. Since the outer sheath fixing portion 33 is not formed at a portion facing the end portion 38, a step portion 40 is formed between a part of the outer sheath 18 fixed by the outer sheath crimping portion 37 and a part of the outer sheath 18 fixed by the end portion 38. Since the outer sheath 18 is pressed by the outer sheath crimping portion 37 and the end portion 38 t at the same time, the outer sheath 18 is firmly fixed. Further, the end portion 38 is not necessarily fixed to be closer to the central side of the optical cable 11 than the outer sheath crimping portion 37. That is, only with folding of the outer sheath crimping portion 37 from the folding portion 39, the end portion 38 can press the outer sheath 18 to the central side of the optical cable 11 such that the step portion 40 is formed between a part of the outer sheath 18 fixed by the outer sheath crimping portion 37 and the other part of the outer sheath 18.

Further, since the first tension member 16 and the second tension member 17 are fixed to the end portions 38, when the end portion 38 fixes the outer sheath 18, the first tension member 16 and the second tension member 17 are crimped between the end portion 38 and the outer sheath 18. Accordingly, the optical cable 11 is fixed to the optical cable terminal brace 30 via the first tension member 16, the second tension member 17 and the outer sheath 18.

Further, in the present embodiment, the second tension member 17 is also fixed to the optical cable terminal brace 30. This configuration will be described in detail by using FIGS. 10 and 11.

Figure 10:
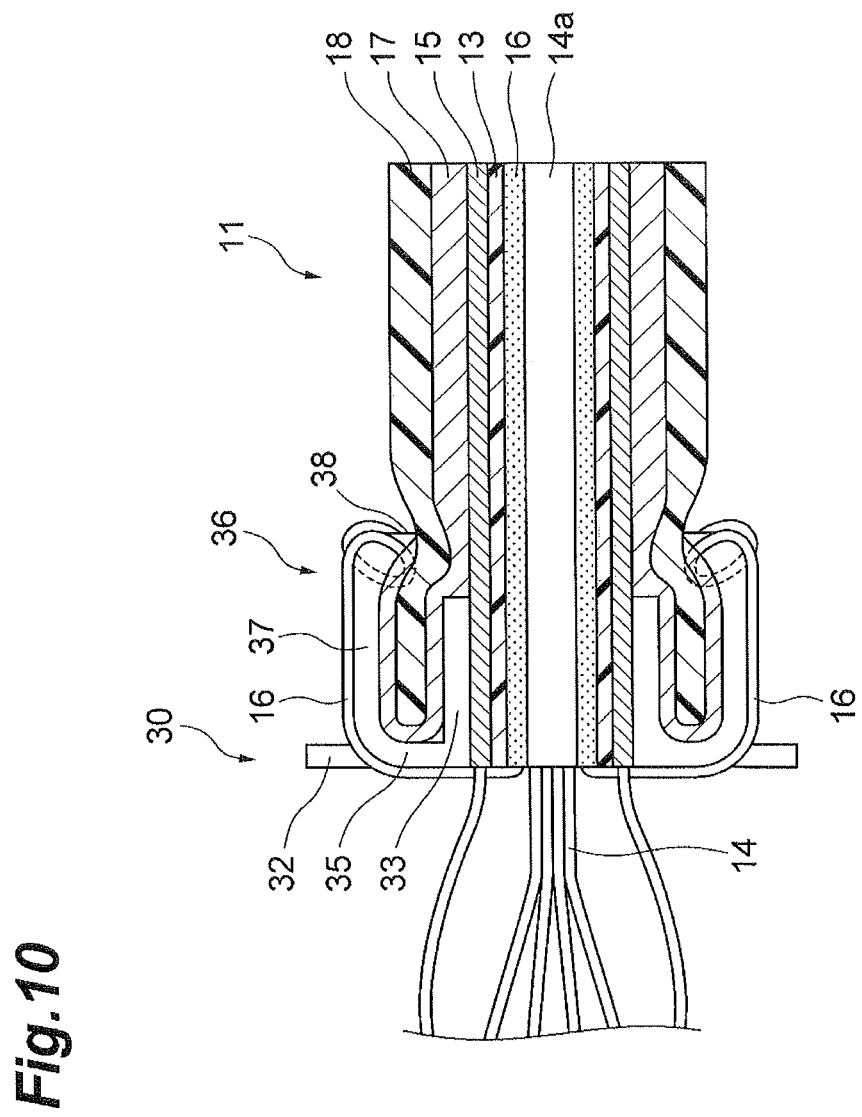
FIG. 10 is a sectional view illustrating an installation state of the optical cable terminal brace of FIG. 6.

FIG. 10 illustrates an example of a method of fixing the second tension member 17 to the optical cable terminal brace 30. In the present embodiment, the second tension member 17 is disposed along the side portion 35. In detail, the second tension member 17 is disposed to extend along a surface that is opposite to a surface on which the first tension member is disposed 16, to the winding portion 36. Further, the first tension member 16 is wound such that the second tension member 17 is inserted between the side portion 35 and the first tension member 16. As a result, the second tension member 17 can be fixed to the optical cable terminal brace 30 together with the first tension member 16.

FIG. 11 illustrates another example of a method of fixing the second tension member 17 to the optical cable terminal brace 30. In the present embodiment, the second tension member 17 is fixed to the optical cable terminal brace 30 by being wound at the side portion 35. In detail, the second tension member 17 is disposed to extend along a surface that is opposite to a surface on which the first tension member 16 is disposed, to the winding portion 36. Further, the second tension member 17 is wound in the same order that the first tension member 16 is wound to the winding portion 36. Further, the first tension member 16 is wound to the winding portion 36 from the above of the second tension member 17.

As a result, the second tension member 17 can be fixed to the optical cable terminal brace 30 together with the first tension member 16.

In this way, by fixing the first tension member 16 and the second tension member 17 to the optical cable terminal brace 30, even when a tensile force is applied to the optical cable 11 in a direction opposite to the fixed direction, the tensile force is diffused into two parts which are the first tension member 16 and the second tension member 17, so that the optical cable 11 can endure the tensile force. As a result, the optical fiber 14 can be protected from the tensile force.

In particular, in the present embodiment, the optical cable 11 includes the first tension member 16 surrounding the optical fiber 14 extending in a predetermined direction of an axial line A. Further, the optical cable 11 has the second tension member 17 surrounding the first tension member 16, and the outer sheath 18 surrounding the second tension member 17, and the electric wire 15 is received inside the outer sheath 18 and the second tension member 17. In such an optical cable 11, the optical fiber 14 and the electric wire 15 can be protected from the tensile force by fixing the second tension member 17 to the optical cable terminal brace 30 together with the first tension member 16. Since the tensile force on the optical cable 11 is typically applied to the outer sheath 18, if the second tension member 17 between the outer sheath 18 and the electric wire 15 is fixed to the optical cable terminal brace 30 to endure the tensile force, the tensile force on the outer sheath 18 is prevented from being applied to the electric wire 15. As a result, the electric wire 15 can be also protected from the tensile force on the optical cable 11. From this point of view, it is preferred that the second tension member 17 is configured to have a Young's Modulus higher than that of the outer sheath 18.

Further, the first tension member 16 is disposed along one surface (inner side of the housing 20) in the side portion 35 through the cable insertion passage 34. Meanwhile, the second tension member 17 is disposed along the other surface (outer side of the housing 20) in the side portion 35 without passing through the cable insertion passage 34. In this way, by fixing each of the first tension member 16 and the second tension member 17 in a state along an opposite surface of the side portion 35, the first tension member 16 and the second tension member 17 can be separated from each other when being fixed to the optical cable terminal brace 30, so that a work efficiency is excellent.

Further, in the present embodiment, the fixing method of the first tension member 16 and the second tension member 17 to the optical cable terminal brace 30 is not limited as long as the first tension member 16 and the second tension member 17 can endure the tensile force applied on the optical cable 11. That is, the first tension member 16 and the second tension member 17 should be directly fixed to the housing 20, or should be indirectly fixed via some members (e.g. the optical cable terminal brace 30 in the present embodiment). The fixing method the first tension member 16 and the second tension member 17 to the optical cable terminal brace 30 may employ an adhesive, in addition to by winding the first tension member 16 and the second tension member 17 as in the aforementioned fixing method.

The optical module of the present invention is not limited to the aforementioned embodiment, and a proper variation, a proper modification, etc. may be allowed.

What is claimed is:

1. An optical module comprising:
    an optical cable including an optical fiber, a first tension member, a second tension member, an outer sheath,
    a housing attached on a terminal of the optical cable, and
    an optical cable terminal brace configured to fix the optical cable to the housing,
    wherein the first tension member and the second tension member are fixed to the housing to endure a tensile force applied to the optical cable,
    wherein the first tension member and the second tension member are fixed to the optical cable terminal brace, and the optical cable terminal brace is fixed to the housing,
    wherein the optical cable terminal brace comprises a main body portion and a side portion at a lateral side of the main body portion,
    wherein the main body portion of the optical cable terminal brace comprises an outer sheath fixing portion configured to fix the outer sheath, and an insertion passage configured to insert the optical fiber into the outer sheath fixing portion,
    wherein the first tension member and the second tension member are fixed to the side portion of the optical cable terminal brace,
    wherein the second tension member is disposed along the side portion of the optical cable terminal, and the first tension member fixes the second tension member to the optical cable terminal brace by inserting the second tension member between the side portion and the first tension member.

2. The optical module according to claim 1, wherein the first tension member passes through the insertion passage, and is disposed along one surface of the side portion, and
    the second tension member does not pass through the insertion passage, and is disposed along the other surface of the side portion.

3. The optical module according to claim 2, wherein the first tension member is fixed to the optical cable terminal brace by being wound at the side portion.

4. The optical module according to claim 3, wherein the second tension member is fixed to the optical cable terminal brace by being wound at the side portion.

5. The optical module according to claim 1, wherein the side portion further comprises a plurality of winding portions,
    the plurality of winding portions are installed symmetrically with respect to a central axis of a cable insertion passage, and
    at least one of the first tension member and the second tension member is wound at the winding portion.

6. The optical module according to claim 1, wherein the side portion is folded forward the main body portion, and
    the outer sheath is fixed to the main body portion while being in contact with the side portion and an outer periphery of the main body portion.

7. The optical module according to claim 2, wherein
    the cable is such that the optical fiber is surrounded with the first tension member, and the first tension member is surrounded with the second tension member.

* * * * *